(12) United States Patent
Zhao et al.

(10) Patent No.: US 9,894,154 B2
(45) Date of Patent: Feb. 13, 2018

(54) DATA SYNCHRONIZATION METHODS AND SYSTEMS

(71) Applicant: Papaya Mobile, Inc., Beijing (CN)

(72) Inventors: Kunliang Zhao, Beijing (CN); Yingying Tian, Beijing (CN); Wenjie Qian, Beijing (CN)

(73) Assignee: Papaya Mobile, Inc., Beijing (CN)

( * ) Notice: Subject to any disclaimer, the term of this patent is extended or adjusted under 35 U.S.C. 154(b) by 465 days.

(21) Appl. No.: 14/512,400

(22) Filed: Oct. 11, 2014

(65) Prior Publication Data

US 2016/0105503 A1    Apr. 14, 2016

(51) Int. Cl.
G06F 17/30 (2006.01)
H04L 29/08 (2006.01)
G06Q 30/02 (2012.01)

(52) U.S. Cl.
CPC ..... H04L 67/1095 (2013.01); G06Q 30/0242 (2013.01); H04L 67/1097 (2013.01)

(58) Field of Classification Search
CPC ............ H04L 67/1095; H04L 67/1097; G06Q 30/0242; G06Q 30/0276
See application file for complete search history.

(56) References Cited

U.S. PATENT DOCUMENTS

| | | | |
|---|---|---|---|
| 8,140,649 B2 | 3/2012 | Durand et al. | |
| 8,155,679 B2* | 4/2012 | Levi | G06Q 30/02 455/414.1 |
| 2004/0218573 A1* | 11/2004 | Takahashi | H04L 29/06 370/338 |
| 2005/0227679 A1* | 10/2005 | Papulov | G06Q 30/02 455/414.3 |
| 2007/0271140 A1* | 11/2007 | Kanno | G06Q 30/02 705/14.56 |
| 2008/0059631 A1* | 3/2008 | Bergstrom | H04N 7/17318 709/224 |
| 2010/0269128 A1* | 10/2010 | Gordon | H04N 7/17318 725/25 |
| 2011/0231478 A1* | 9/2011 | Wheeler | G06F 17/30864 709/203 |
| 2011/0258049 A1* | 10/2011 | Ramer | G06F 17/30867 705/14.66 |
| 2013/0111165 A1* | 5/2013 | Ozawa | G06F 11/2089 711/162 |
| 2013/0185162 A1* | 7/2013 | Mo | G06Q 30/0241 705/14.69 |
| 2013/0231043 A1* | 9/2013 | Tawfiq Moshtaha | G06Q 30/02 455/3.01 |

(Continued)

*Primary Examiner* — Leslie Wong
(74) *Attorney, Agent, or Firm* — Banner & Witcoff, Ltd.

(57) ABSTRACT

Aspects described herein are directed towards receiving records from various devices, processing and storing the records, and retrieving records in response to requests for the records. The records may originate from different devices and be stored in a central location. Retrieval of the records may be from the central location in response to requests from independent devices. Additional aspects include using one or more records requesting clients at a device depending on network conditions experienced by the device and adjusting the number of active requesting clients based on network conditions and storage conditions of the device.

8 Claims, 6 Drawing Sheets

(56) References Cited

U.S. PATENT DOCUMENTS

| | | | |
|---|---|---|---|
| 2014/0214535 A1* | 7/2014 | Kee | G06Q 30/0275 705/14.53 |
| 2015/0026719 A1* | 1/2015 | Menon | H04N 21/2668 725/34 |
| 2015/0170209 A1* | 6/2015 | Smith | G06Q 30/0267 705/14.64 |
| 2016/0260132 A1* | 9/2016 | Han | G06Q 30/0258 |

* cited by examiner

DATA SYNCHRONIZATION METHODS AND SYSTEMS

FIELD

Aspects described herein relate generally to synchronizing data between different devices. More specifically, aspects described herein relate to synchronizing data in different devices from data stored in a data synchronization pipeline.

BACKGROUND

In some systems, events may occur at disparate devices and reports of these events may be synchronized across multiple devices in the system. With the many different devices and storage devices in the system, it may be difficult to track and store the reports of all of these events and changes while maintaining consistency of the records across all of the storage devices in the system and adjusting for network conditions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards receiving records from various devices, processing and storing the records, and retrieving records in response to requests for the records.

Aspects of the disclosure include receiving records from various devices and processing and storing the data records. The data record may be received by a first computing device with a command to write the data record to a storage area. In response to the command, a sequence identifier for the data record may be generated. The sequence identifier may be associated with the data record being stored and stored with the data record in the storage area.

In some aspects, a request may be received by a first computing device from a second computing device remote from the first computing device. The request may be to retrieve at least one data record and may include a checkpoint value. A first data record may be identified based on the checkpoint value. The first data record and at least one data record sequentially after the first data record may be transmitted to the second computing device.

In another aspect, a computing device may have more than one client requesting data records. A first requesting client may transmit a first request for a first set of data records, and a second requesting client may transmit a second request for a second set of the data records. In response to the first request, the first set of data records may be retrieved and transmitted to the first requesting client, and in response to the second request, the second set of the data records may be retrieved and transmitted to the second requesting client. The number of active clients may be adjusted depending on network conditions.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
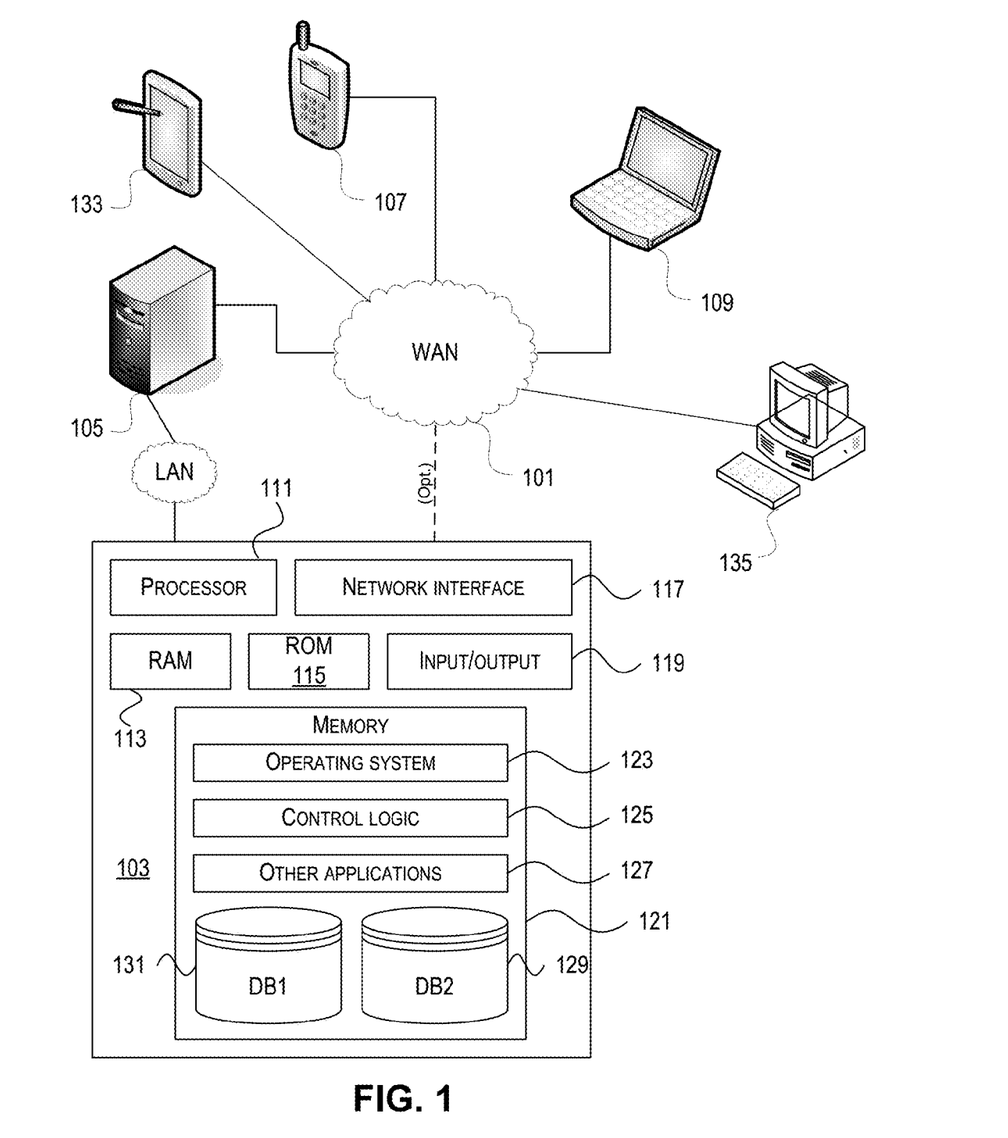
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, 109, 133, and 135 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109, 133, and 135 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109, 133, 135. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, 133, 135, e.g., using a web browser to connect to the data server 103 via one or more externally exposed web sites hosted by web server 105. Client computers 107, 109, 133, 135 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109, 133, 135 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109, 133, 135 may have similar or different architecture as described with respect to device 103. Those of skill in the art will appreciate that the functionality of data processing device 103 (or device 105, 107, 109, 133, 135) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Components 105, 107, 109, 133, 135 may be personal computers, mobile devices, laptop computers, tablets, or servers that include many or all of the elements described above with respect to the computing device 103. The network connections depicted in FIG. 1 include a local area network (LAN) and a wide area network (WAN), but may also include other networks. The components 105 may be connected to the LAN through a network interface or adapter. When used in a WAN networking environment, components 105, 107, 109, 133, 135 may include a modem or other wide area network interface for establishing communications over the WAN, such as computer network (e.g., the Internet). It will be appreciated that the network connections shown are illustrative and other means of establishing a communications link between the computers may be used. Components 107, 109, 133 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

Figure 2:
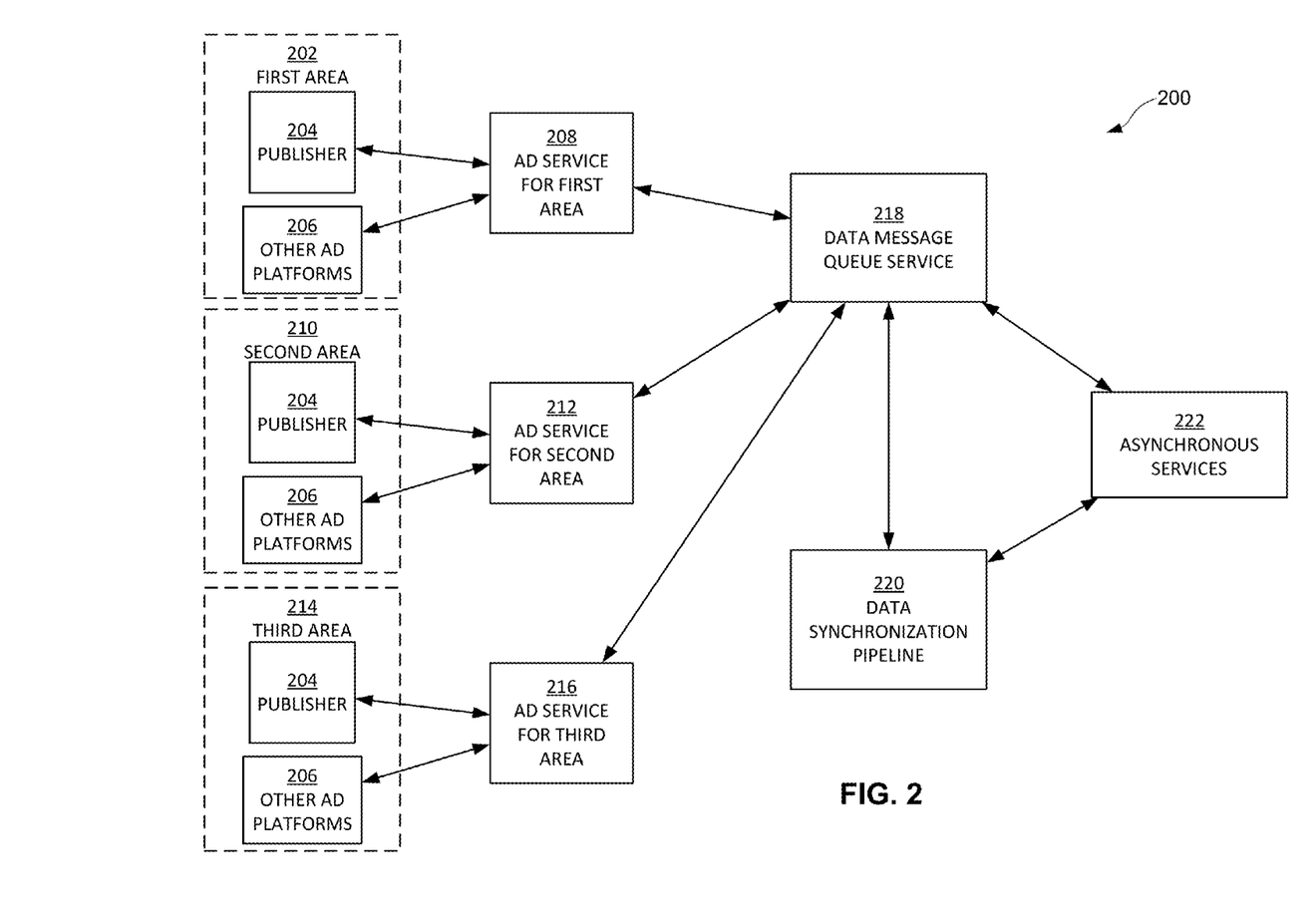
FIG. 2 depicts an illustrative advertisement platform conversion system in accordance with one or more illustrative aspects described herein.

FIG. 2 illustrates an example advertising system including a data synchronization system 200 in accordance with aspects described herein. Each server may represent one or more servers and each module may be implemented using one or more servers. The connections between the different servers and/or modules may be bidirectional, and the arrows in FIG. 2 may represent general data flow between servers and/or modules in the system 200. The system 200 may include publishers 204, other advertisement (ad) platforms 206, ad service servers 208, 212, 216, data message queue service 218, data synchronization pipeline storage 220, and asynchronous services 222. The components 208, 212, 216, 218, 220, 222 of system 200 may be implemented on one or more data servers 103 and/or web servers 105. Publishers 204 may be implemented on one or more client computers 107, 109, 133, 135, or data servers 103 and/or web servers 105 of another ad platform or network.

Publisher 204 may include one or more platforms or parties who display advertisements in exchange for payment or similar services from another publisher. For example, publishers may include application developers or other advertising networks who provide space and/or the opportunity to display an advertisement to a user or potential customer. Publisher 204 and/or publishers of other ad platforms 206 may send advertisement requests to ad service servers 208, 212, 216 to request creative content or advertisements to place in the publisher's advertising space which may be in the publisher's application (e.g., mobile device application). The advertisement request may include request information or dimension information such as demographics of potential ad viewers (e.g., user internet protocol (IP) address, user country, user language, user location (e.g., latitude, longitude), user mobile carrier, user device information (e.g., brand, model, operating system (OS), operation system version, user gender, user age, user's unique identifier, user application identifier, user application domain), advertisement size or dimensions (e.g., advertisement container weight, advertisement height, advertisement container screen position) and/or type (e.g., image, banner, video, pop-up, splash screen) of creative content that may be displayed within the publisher's application or other ad platform 206.

Ad service server 208, 212, 216 may receive and process ad requests from publishers 204 and respond to the ad requests. Ad service server 208, 212, 216 may receive ad event reports on user interaction with displayed ads from publishers 204 or other ad platforms 206. Ad service servers 208, 212, 216 may transmit or forward the ad event reports to data message queue service 218 and initiate requests to retrieve data records or to synchronize data records. Each ad service server may be responsible for handling requests and ad reports from publishers 204 and ad platforms 206 located in a particular geographical area. The example depicted in FIG. 2 shows a first area 202 including a publisher 204 and other ad platforms 206, and the publisher 204 and other ad platforms 206 located in the first area 202 may direct their ad requests and other communication to the ad service server responsible for the first area, ad service server 208. Similarly, a second area 210 may include publisher 204 and other ad platforms 206, and publisher 204 and ad platforms 206 may direct their communications and requests to ad service server for the second area 212. A third area 214 may be present with a third ad service server for the third area 216 responsible for communications to and from publishers and/or ad platforms in the third area 214. While the example in FIG. 2 shows three areas, there may be any number of areas of publishers and/or other ad platforms and a corresponding ad service server responsible for each area. Areas may be geographic areas including those defined by borders (e.g., countries, states, provinces, cities, counties, territories, etc.), those defined by natural borders (e.g., continents, peninsulas, islands, etc.), and regions (e.g., northwest, midwest, south, mid-atlantic, northeast, north, Baltic states, Scandinavia, Mediterranean countries, etc.).

Data message queue service 218 may receive ad event reports or ad data records from ad services 208, 212, 216. Data message queue service 218 may store the ad reports or ad data records as tasks for processing by asynchronous services 222. Data message queue service 218 may facilitate synchronization of data across all ad service servers by processing data requests for adding and retrieving data from data synchronization pipeline 220 in response to requests to pull data records from ad service servers 208, 212, 216. The data requests to pull records may be stored as tasks to be processed by data synchronization pipeline 220.

Data synchronization pipeline storage 220 may receive and store data records or ad reports from data message queue service 218 and/or asynchronous service 222. Data synchronization pipeline 220 may be a central repository with which all ad service servers can synchronize by pulling or retrieving data records from data synchronization pipeline 220. Data synchronization pipeline 220 may store all data records available in system 200 for a given period of time or time window. For example, data synchronization pipeline 220 can store all records having an identifier corresponding to a time occurring within a window of time or time frame (e.g., last 7 days, last 2 days, last month, etc.). The length of the time frame may depend on the number of records within the time frame and the amount of available storage in the distributed synchronization pipeline 220. Data synchronization pipeline 220 may respond to requests to pull or synchronize data records received from various sources including ad service servers 208, 212, 216, data message queue service 218, and asynchronous services 222.

Asynchronous services 222 may track ad requests and ad events as well as process transactions associated with ad requests and ad events. Asynchronous services 222 can use the reported ad events to determine and track the status of active advertising campaigns and can generate reports on ad campaign statuses. The ad reports on campaign statuses may be stored in data synchronization pipeline 220 as ad records which are distributed to ad service servers to update ad service servers in different areas on the global status of advertising campaigns. The ad records on the global statuses of the advertising campaigns can be taken into account when ad service servers are determining whether to process a request for an ad.

Figure 3:
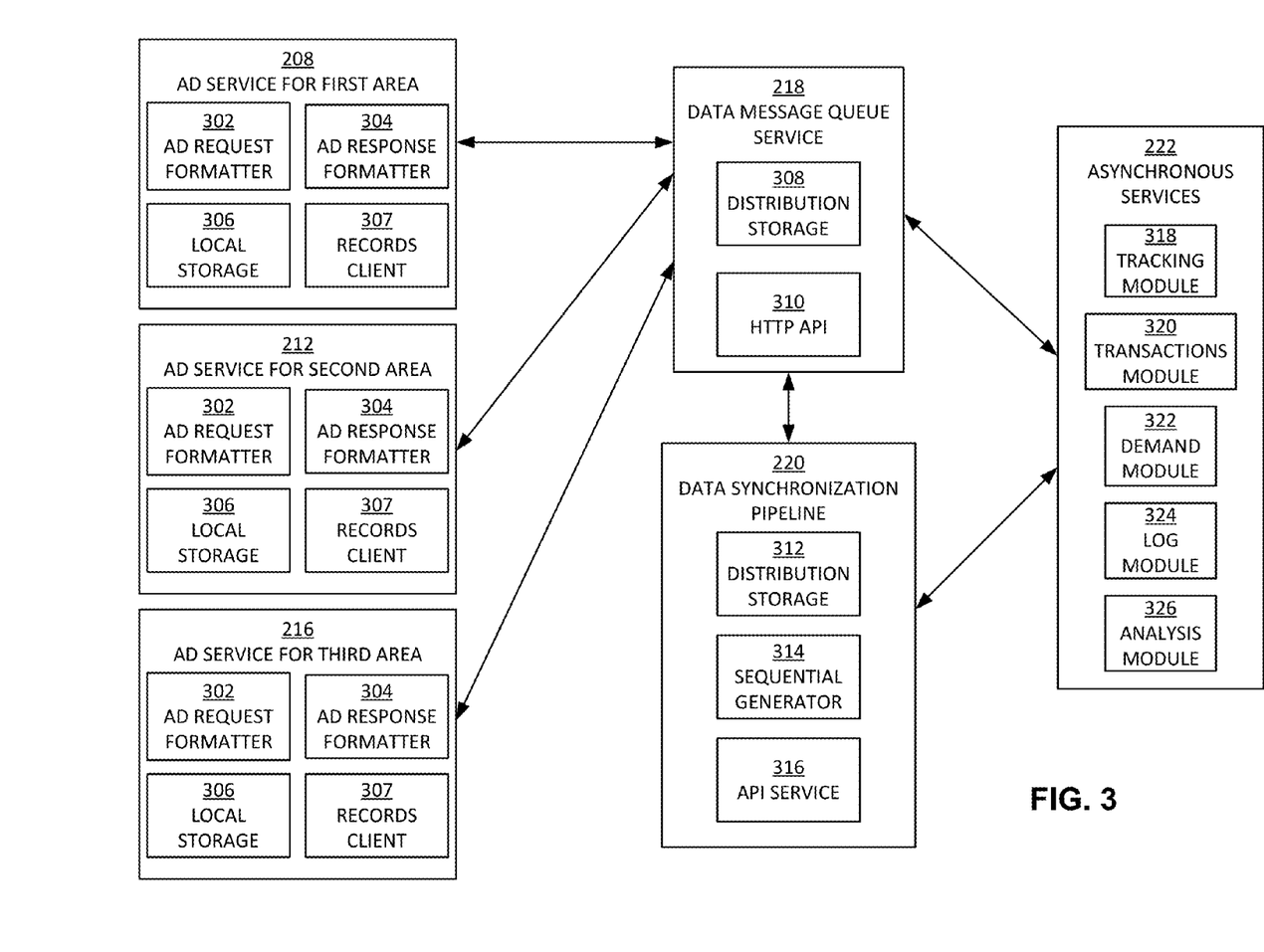
FIG. 3 depicts an illustrative system in accordance with one or more illustrative aspects described herein.

FIG. 3 shows portions of system 200 in more detail. FIG. 3 shows various modules and/or devices of ad service servers 208, 212, 216, data message queue service 218, data synchronization pipeline storage 220, and asynchronous services 222.

Ad service servers 208, 212, 216 may each include an ad request parser and formatter 302, an ad response formatter 304, local storage 306, and at least one records client 307. Ad request formatter 302 may receive ad requests in a first format and translate the ad requests into a format standard for the system 200. Ad request formatter 302 may associate or assign information included in the ad request to a dimension of system 200. For example, an ad request may request an advertisement to be displayed for a male user aged 30 and request that the advertisement be in the form of a banner ad with particular size dimensions. The ad request parser may identify each dimension and store information obtained from the ad request as dimension information. For dimensions which the ad request does not specify, a default value may be assigned such as null. Ad request formatter 302 may generate a global unique identifier such as a transaction identifier to identify the ad through the entire ad process flow. The entire ad process flow may include events such as bidding, impression, click, install and/or other actions. Ad service servers 208, 212, 216 may receive from publishers and/or other ad platforms reports of the ad events and generate ad event reports to transmit to data message queue service 218. Each ad event report or ad record may include information on the type of ad event (e.g., bidding, impression, click, and/or install) and information about demographics of the viewer such as the dimension information of the viewer as described above. Ad service servers 208, 212, 216 might directly transmit ad event reports to data message queue service 218 without saving a corresponding ad record in local storage 306. The records in local storage 306 may be entirely populated with records retrieved from data synchronization pipeline 220 in response to retrieval requests from ad service servers 208, 212, 216. Each ad service 218 may monitor or keep track of data records which the respective ad service 218 is missing or needs to request from data synchronization pipeline. For example, an ad service server may generate a request to retrieve records from data synchronization pipeline based on a timestamp of the ad records having the most recent or latest timestamp.

Data message queue service 218 may include a distribution storage 308 and hypertext transfer protocol (HTTP) based application programming interface (API) 310. Data message queue service 218 may receive ad event reports from ad service servers 208, 212, 216 and store the ad event reports in distribution storage 308. The received ad event reports may be stored as tasks for processing by asynchronous services 222. Each task and/or ad report may include an ad service server identification field to identify the ad service server from which the report originated. The ad service server may be identified by its internet protocol (IP) address, medium access control (MAC) address, and/or the region that the ad service server serves. Data message queue service 218 may further forward the ad event reports to asynchronous services 222 for ad campaign related logging and processing and data synchronization pipeline for 220 for ad record storage. For example, the occurrence of each event may be stored in a log by a log module 324 in asynchronous services 222. API 310 may define commands which can be used to write data to the pipeline and read data from data synchronization pipeline 220. For example, ad service server 208 may use a PUT API command to push data from ad service server 208 to data synchronization pipeline 220 via data message queue service 218. As another example, ad service server 208 may use a GET API command to request or to read data from data synchronization pipeline 220. In response to the request to retrieve records (e.g., GET command), data message queue service 218 may receive batch records corresponding to the request. Data message queue service 218 may store the batch records in distribution storage 308 and generate a response to the request received from the requesting ad services server. Asynchronous services 222 may request tasks to process from data message queue service 218 and delete the task from the data message queue service so that the task is only processed once. Asynchronous services 222 may request a task using the GET command.

Figure 4:
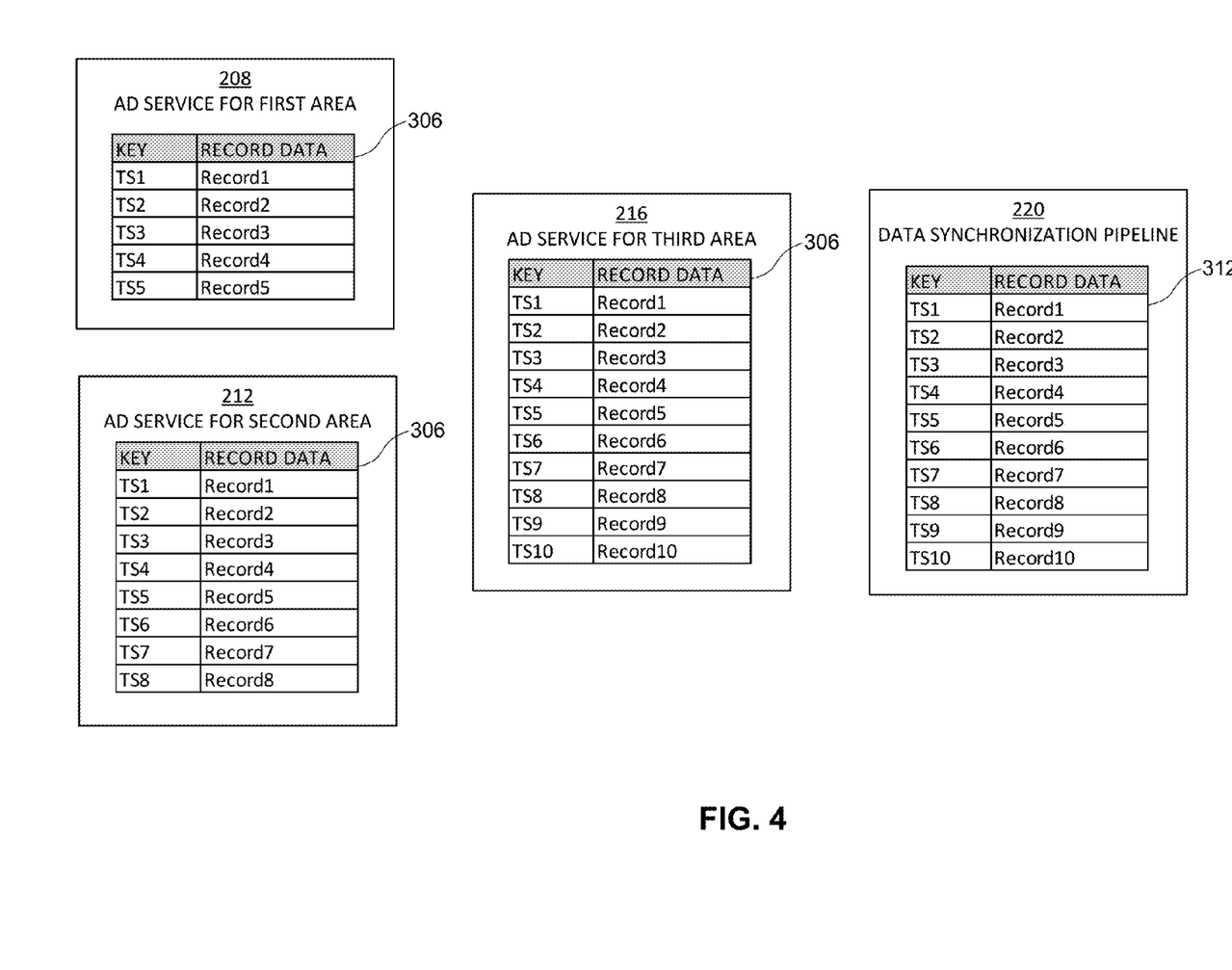
FIG. 4 depicts an illustrative storage scenario in accordance with one or more illustrative aspects described herein.

Data synchronization pipeline 220 may include a distribution storage 312, a sequential generator 314, and a API service 316. Distribution storage 312 may store all data records generated from all sources in the system 200. The stored data records may be all records generated during a specific time frame and/or having a sequential identifier (e.g., timestamp) corresponding to times within the specific time frame. A key-value database type such as Memcached or Redis may be used to organize the data records so that the data may be easily and quickly located and retrieved. Memcached is an open-source caching system originally developed by Danga Interactive, and Redis is an open-source key-value cache and store. A unique key may be used to identify each record, for example, the sequential identifier. Sequential generator 314 may generate a sequential identifier (e.g., timestamp) to use as the key for identifying a received record if a sequential identifier is not already included with the record. The records in distribution storage 312 may be stored in sequence and/or in chronological order according to their respective sequential identifiers an example of which is shown in FIG. 4 which will be described in more detail. API service 316 provides an interface for data message queue service 218 and asynchronous services 222 to use commands to read data from and write data to data synchronization pipeline 220. For example, a GET API command can be used to retrieve data stored in distribution storage 312, and a checkpoint value may be received with the GET command. The checkpoint value may be a timestamp of the first record to retrieve, or the first record to retrieve may be the first record immediately following the timestamp. In response to the GET API call, data synchronization pipeline 220 can return batch records to data message queue service 218 or directly to the requesting ad service server identified in a request or task field in order of sequence numbers starting with the sequence number indicated by the checkpoint value up to the most recent record.

Asynchronous services 222 may include a tracking module 318, a transactions module 320, a demand module 322, a log module 324, and an analysis module 326. Tracking module 318 may assign a unique transaction identifier for each campaign or advertisement type and ad events may be tracked using the transaction identifier. Transactions module 320 may handle processing of the ad transaction such as charging the advertiser's account for displaying the ad and crediting the publisher's account for displaying the ad. Demand module 322 may track inventory of available ads to display. Log module 324 may store information about each ad event in an ad's life cycle including ad event reports received from data message queue service 218. For example, the log may be in the form of a table with the life cycle of each ad being a row of data including the transaction identifier of the ad, the dimensions or characteristics of the user shown the ad, bid price, and whether the ad was an impression, clicked and/or installed. The ad event reports in data message queue service 218 may be stored as tasks to be processed by asynchronous services 222. Asynchronous services may request a task to process from data message queue service and the tasks may be deleted from data message queue service once requested by asynchronous services.

Figures 5, 6:
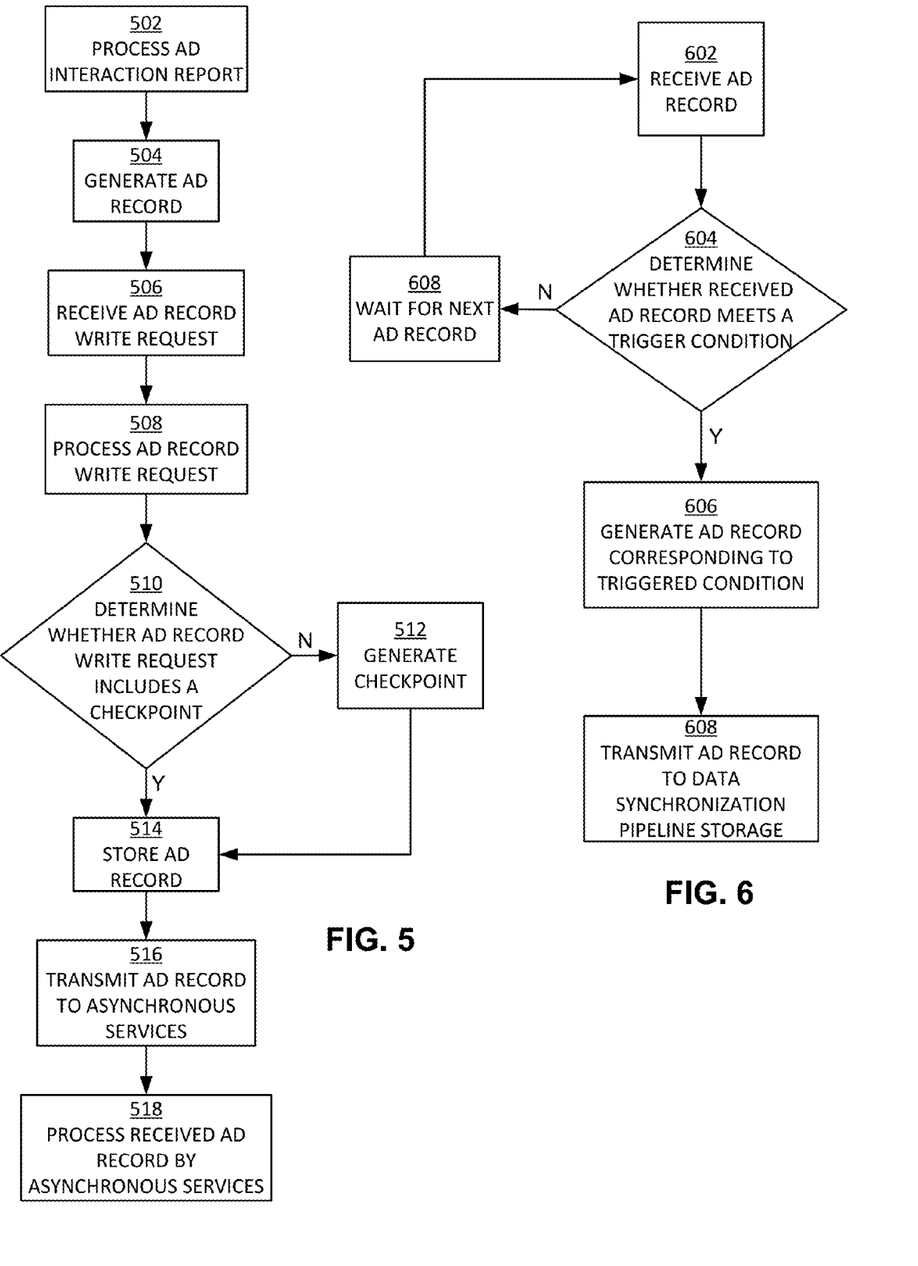
FIG. 5 depicts an illustrative method of processing indication of an ad event in accordance with one or more illustrative aspects described herein.
FIG. 6 depicts an illustrative method of ad record processing in accordance with one or more illustrative aspects described herein.
Figure 7:
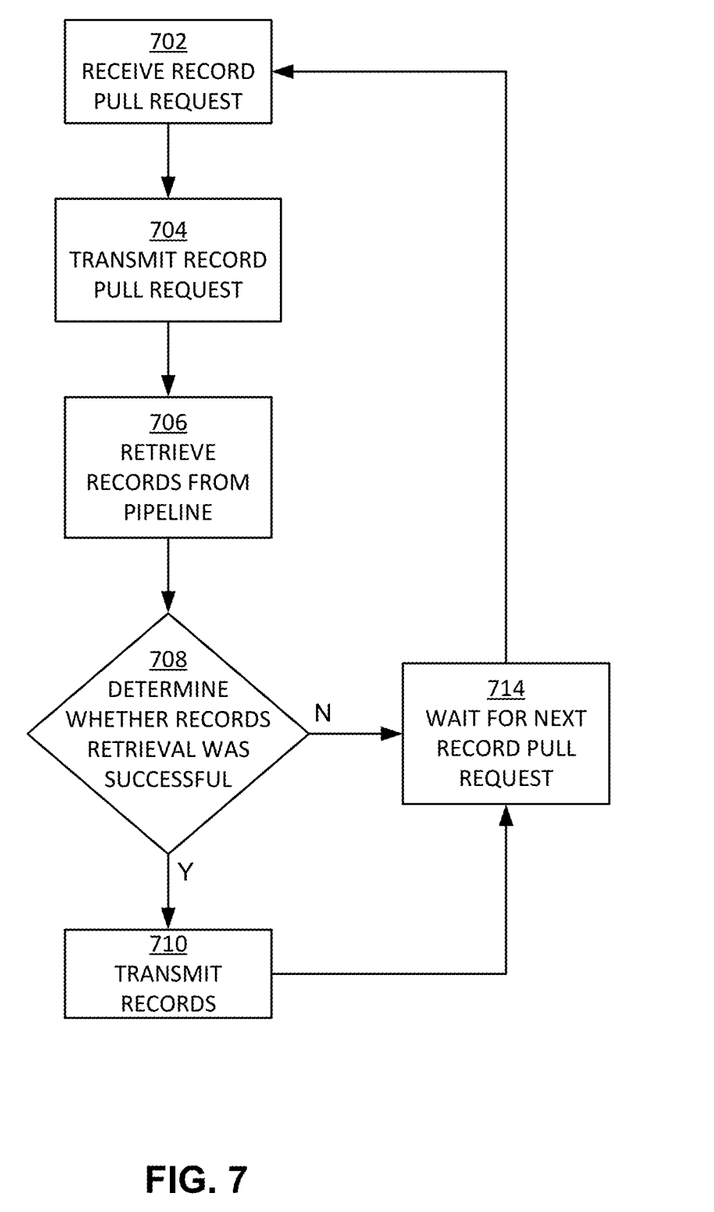
FIG. 7 depicts an illustrative method of retrieving a record in accordance with one or more illustrative aspects described herein.

FIG. 4 shows an example of data record storage in ad service servers 208, 212, 216 and data synchronization pipeline storage 220 for ease of describing the methods illustrated in FIGS. 5-7. As discussed herein, a key-value database type may be used to organize data stored in ad service servers 208, 212, 216 and data synchronization pipeline storage 222 to ensure that a data record can be easily located and retrieved. For example, each data record may be associated with a unique key. To locate and pull a particular record, only the key of the particular record is needed because the key uniquely identifies the particular record. As shown in FIG. 4, the timestamp of the data record may be used as the key. The data records may be stored in local storage 306 of the ad service servers 208, 212, 216 and distribution storage 312 of data synchronization pipeline. Data records stored in local storage 306 of each ad service server 2082, 212, 216 may be independently synchronized from distribution storage 312.

Ad service servers 208, 212, 216 may be frequently requesting or requesting at intervals (e.g., every 30 seconds, 1 minute, 5 minutes, etc.) to retrieve the latest data records from the data synchronization pipeline. Ad service servers 208, 212, 216 may be frequently or continuously requesting data records to keep the records stored within their respective local storage current or up-to-date. For example, ad service server 216 includes the latest record Record10 and is current because ad service server 216 includes at least all of the same records currently in data synchronization pipeline 220. Ad service servers 208 and 212 are both behind and have not yet received more recent records.

FIG. 5 illustrates an example method of processing an ad report in accordance with aspects described herein. At step 502, data message queue service 218 may process an ad event report reporting a bid, impression, click, and/or installation of an ad. A publisher or other ad platform may notify ad service server that an ad event has occurred, and ad service server may generate an ad event report to transmit to data message queue service 218. At step 504, data message queue service 218 may generate an ad record based on ad events reported by ad service servers or use the ad report from the ad service servers as the data records. For example, the ad report or ad record may include a transaction identifier of the ad, event type (e.g., bid, impression, click, and/or installation), and information about the viewer shown the ad. The ad record may be stored as a task for processing by asynchronous services 222.

At step 506, data message queue service may transmit instructions to store the received ad record in or add the received ad record to data synchronization pipeline 220 using for example a PUT command. In some instances, data message queue might not push every ad record to data synchronization pipeline 220. Data message queue may only add records of certain types of ad events to the data synchronization pipeline 220.

At step 510, data synchronization pipeline storage 220 may determine whether the ad record included with the write request includes or is already assigned a sequential identifier (e.g., timestamp, sequence number). If a sequential identifier is not included, data synchronization pipeline storage may generate a sequential identifier such as a timestamp of the ad record at step 512. The timestamp may be the time that the event occurred or the time at which the ad service server, data message queue service, or data synchronization pipeline receives a report of the ad event. If a sequential identifier is included with the write request, data synchronization pipeline storage 220 may directly proceed with storing the ad record in distribution storage 312 and adding or including the ad record in the database. For example, data synchronization pipeline storage 220 may add or include the sequential identifier and corresponding ad record in a key-value database as shown in the example of FIG. 4.

At step 516, data message queue service may send the ad record to asynchronous services 222. Asynchronous services may request a task for processing from data message queue service, for example, using a GET command. Data message queue service may send the ad record or report for processing by asynchronous services and delete the task associated with the ad record or report from the data message queue service. At step 518, asynchronous services 222 may process the ad record, for example, as shown in FIG. 6.

FIG. 6 illustrates an example method of ad record processing in accordance with some aspects described herein. At step 602, asynchronous services 222 may receive an ad record from data message queue service 218. At step 604, asynchronous services may process the received ad record and determine whether the ad interaction reported or indicated by the ad record meets any trigger conditions (e.g., monetary limit, daily limit, publisher limit, event limit). An event limit may be a limit of the number of impressions, clicks, or installations of a particular ad. For example, the ad event report may be reporting an impression for a particular ad that may have a daily limit of 1,000 impressions. The impression reported for the ad may be the thousandth impression of the day. In response to determining that the ad meets a trigger condition, asynchronous services 222 may generate an ad record indicating that the ad has met its daily allowance or limit at step 606. The ad record may be transmitted to data synchronization pipeline storage 220 at step 608 to be propagated or distributed to all of the ad service servers 208, 212, 216 according to aspects described herein. In response to receiving an ad record indicating that the ad meets a trigger condition, the ad service servers may disable or remove the ad from being available for impressions in publishers of their respective areas.

In another aspect, asynchronous services 222 may push data to the data synchronization pipeline in response to the creation or exiting of an advertising campaign. For example, a user or administrator such as an advertising campaign manager may create a new ad campaign or close down an existing ad campaign. In response to this change in the status of an advertising campaign, asynchronous services 222 may determine which user segments (e.g., users who meet the target dimensions) need to be updated and push or send the ad results to the data synchronization pipeline. The ad results may include information about a new campaign, exited or closed campaigns, and updates of currently available or running campaigns, and the information may include the price of the campaign, an advertising image, and/or daily limits for clicks and/or conversions. When the ad service servers retrieve data from the data synchronization pipeline, the ad service servers will update their respective local storage with the ad results to enable publishers in their respective areas to adjust to the currently available ad campaigns. For example, the publishers will be able to request ads for new ad campaigns, and/or discontinue showing ads from closed campaigns.

FIG. 7 illustrates an example method of retrieving ad records in accordance with aspects described herein. At step 702, one or more ad service servers 208, 212, 216 may send to data message queue service a pull request or request to retrieve records from data synchronization pipeline 220. For example, ad service server 208 shown in FIG. 4 may store records up to timestamp TS5, and the request may include a checkpoint value of timestamp TS5 as an indication to begin retrieving or pulling records beginning with those records corresponding to timestamp TS5 and later or begin pulling records after timestamp TS5. Ad service server 208 may use as the timestamp in the request the timestamp of the most recent record stored in local storage 306.

At step 704, data message queue service 218 may store the received request as a task message in distribution storage 308 and process the task message by transmitting a record pull or retrieval request to data synchronization pipeline in response to receiving requests from ad service servers via commands using API service 316. At step 706, data synchronization pipeline 220 may receive the request and retrieve records from distribution storage 312 based on the request. For example, the request may include a checkpoint value of timestamp TS5, and data synchronization pipeline 220 may begin processing records starting with Record5, which corresponds to timestamp TS5, and subsequent records (e.g., Record6-Record10) for sending to the requesting ad service server or begin processing records after timestamp TS5 (e.g., Record6-Record10). At step 708, the data synchronization pipeline may determine whether the records retrieval in response to the request was successful. If the records request retrieval was successful, data synchronization pipeline may proceed to step 710 and transmit the records directly to the requesting ad service server. Data message queue service may receive the pulled records from data synchronization pipeline and forward or transmit the pulled records to the corresponding requesting ad service server.

Returning to step 708, if the data synchronization pipeline determines at step 708 that record retrieval was not successful, the data synchronization pipeline may proceed to step 714 and wait for the next record pull record request. A record retrieval might not be successful when a request contains a checkpoint value for which no record corresponds and no records were stored and/or generated after the time associated with the checkpoint value. Using the example in FIG. 4, the checkpoint value may correspond to timestamp TS11 which occurs sequentially after timestamp TS10. Because there are no records in data synchronization pipeline 220 sequentially after timestamp TS10, a record retrieval request containing a checkpoint value of timestamp TS11 might be unsuccessful.

According to another aspect, the system can dynamically adjust to network conditions when pulling records from data synchronization pipeline 220. Each ad service server 212 may have multiple processes or clients which can concurrently and independently of each other transmit requests for record retrieval from data synchronization pipeline 220. The number of clients or number of instances of a client active at one time in an ad service server can depend on the network conditions (e.g., latency, bandwidth, congestion) experienced on the communication route between the ad service server and data message queue service 218 and/or data synchronization pipeline 220. When a difference between the timestamp of the most recent record in local storage 306 and a current time is greater than a first threshold (e.g., 1 hour, 2 hours, one day, etc.), an additional records client 307 may be added or activated. For example, the timestamp of the most recent record in local storage 306 of ad service server 208 may be timestamp TS5 as shown in the example of FIG. 4. Timestamp TS5 may correspond to a time of 4:00 pm on a given day, and the current time may be 6:05 pm on the same day. The ad service server 208 may determine that the difference between the time of the last record (e.g., timestamp TS5) and the current time is two hours and 5 minutes. If the first threshold is, for example, 1 hour, ad service server 208 may activate one or more records clients 307 to retrieve records in order to more quickly bring local storage 306 of ad service server 208 up-to-date.

Similarly, as the records stored in an ad service server become closer to the current time, records clients 307 may be removed or deactivated. For example, when the difference between the timestamp of the most recent record in local storage is less than a second threshold which may be the same or different from the first threshold, a client may be removed or deactivated. Continuing with the previous example, the current time may now be 7:10 pm of the same time and the last or most recent record in local storage 306 may now have a timestamp of 6:15 pm. In response to the time difference between the current time and the most recent record becoming less than the second threshold, ad service server 208 may remove one or more records clients 307 from service.

When more than one records client is activated, records to be requested by each records client may be evenly distributed between the clients. Each records client may request a different set of the records stored in data synchronization pipeline 220. For example, when two records clients are active, a first records client may request to retrieve even numbered records and a second records client may request to retrieve odd numbered records from data synchronization pipeline server. Similarly, when three records clients are active, each records client may request every three records. A first records client may request the first, fourth, seventh, etc. records. A second records client may request the second, fifth, eighth, etc. records, and a third records client may request the third, sixth, ninth, etc. records. Any number of records clients may be active at a time. In some aspects, there may be some overlap in the records retrieved by the different records clients. For example, some of the records clients may request to retrieve some of the same records.

Aspects described herein provide mechanisms of keeping data consistent in time across multiple servers or databases. Some aspects provide the flexibility of allowing each server or database to individually determine records needed to update the records stored in the server or database and to incrementally synchronize the storage of individual servers or databases with a central source. Processing and tracking of records stored in each server or database and needed records may be distributed across the system. Furthermore, a checkpoint value may be the only information needed to indicate which records need to be retrieved.

While illustrative method steps have been described as being performed by a computing device, it is to be understood that the steps may be performed in a different order than described and may be performed by more than one computing device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
receiving, by a first computing device from a first client of a second computing device remote from the first computing device, at least one request to retrieve at least one data record from a data storage area storing a plurality of data records in sequence order based on sequence identifiers of the plurality of data records, the at least one request comprising a checkpoint value;
identifying a first data record having a first sequential identifier corresponding to the checkpoint value;
determining a time difference between a time associated with a most recent stored data record and a current time;
based on the time difference being greater than a threshold, causing activation of a second client of the second computing device; and
in response to the at least one request, transmitting, to the second computing device, the first data record and at least one data record having a sequential identifier sequentially after the first sequential identifier.

2. The method of claim 1, further comprising:
receiving, by the first computing device from a third computing device remote from the first computing device, a write request comprising a second data record;
generating a second sequential identifier for the second data record; and
storing the second data record with the second sequential identifier in the data storage area in the sequence order.

3. The method of claim 2, further comprising:
transmitting, by the first computing device, the second data record to a third computing device, wherein the second data record comprises an advertising event associated with an advertising campaign; and
storing, by the third computing device, the advertising event in a log associated with the advertising campaign and updating a transaction status of the advertising campaign.

4. The method of claim 1, wherein transmitting the first data record and at least one data record having a sequential identifier sequentially after the first sequential identifier comprises:
transmitting the first data record and all data records having a sequential identifier sequentially after the first sequential identifier.

5. The method of claim 1, wherein the first client is a first records client, wherein the second client is a second records client, and wherein receiving, by the first computing device from the second computing device remote from the first computing device, at least one request to retrieve at least one data record from the data storage area comprises:
receiving, by the first computing device from the first records client of the second computing device, a first request to retrieve a first set of data records; and
receiving, by the first computing device from the second records client of the second computing device, a second request to retrieve a second set of data records.

6. The method of claim 5, wherein the second set of data records comprises data records different from data records of the first set.

7. The method of claim 4, wherein the checkpoint value comprises a timestamp, and wherein transmitting the first data record and all data records having a sequential identifier sequentially after the first sequential identifier comprises transmitting the first data record and all records having a timestamp chronologically later than the checkpoint value.

8. The method of claim 2, wherein the third computing device receives data records for a first geographical area, and the method further comprises:
receiving, by the first computing device from the second computing device remote from the first computing device, a write request comprising a third data record, wherein the second computing device receives records for a second geographical area; and
transmitting, by the first computing device, a command to store the third data record in a data synchronization storage.

* * * * *